US010320839B2

(12) United States Patent
Mattila et al.

(10) Patent No.: US 10,320,839 B2
(45) Date of Patent: Jun. 11, 2019

(54) AUTOMATIC ANTI-SPOOF FOR MULTICAST ROUTING

(71) Applicant: Forcepoint, LLC, Austin, TX (US)

(72) Inventors: Ville Mattila, Helsinki (FI); Tomi Salminen, Helsinki (FI); Tuomo Syvänne, Helsinki (FI)

(73) Assignee: Forcepoint, LLC, Austin, TX (US)

(*) Notice: Subject to any disclaimer, the term of this patent is extended or adjusted under 35 U.S.C. 154(b) by 158 days.

(21) Appl. No.: 15/708,504

(22) Filed: Sep. 19, 2017

(65) Prior Publication Data

US 2019/0089735 A1    Mar. 21, 2019

(51) Int. Cl.
*H04L 29/06* (2006.01)
*H04L 29/12* (2006.01)
*H04L 12/813* (2013.01)

(52) U.S. Cl.
CPC ......... *H04L 63/1466* (2013.01); *H04L 47/20* (2013.01); *H04L 61/2007* (2013.01); *H04L 63/0227* (2013.01); *H04L 63/1425* (2013.01)

(58) Field of Classification Search
CPC .................................................. H04L 63/1466
See application file for complete search history.

(56) References Cited

U.S. PATENT DOCUMENTS

| | | | | |
|---|---|---|---|---|
| 8,060,904 B1* | 11/2011 | Evans | ............. | H04N 21/23424 |
| | | | | 725/100 |
| 2003/0169724 A1* | 9/2003 | Mehta | ............. | H04L 12/185 |
| | | | | 370/352 |
| 2005/0027782 A1* | 2/2005 | Jalan | ............. | H04L 12/1886 |
| | | | | 709/200 |
| 2009/0175211 A1* | 7/2009 | Jakobsen | ............. | H04B 7/026 |
| | | | | 370/312 |
| 2013/0034097 A1* | 2/2013 | Dharmapurikar | ..... | H04L 45/026 |
| | | | | 370/390 |

(Continued)

OTHER PUBLICATIONS

Papadopoulos et al.; An error control scheme for large-scale multicast applications; Published in: Proceedings. IEEE INFOCOM '98, the Conference on Computer Communications; Date of Conference: Mar. 29-Apr. 2, 1998; IEEE Xplore (Year: 1998).*

(Continued)

*Primary Examiner* — Bradley W Holder
(74) *Attorney, Agent, or Firm* — Terrile, Cannatti & Chambers; Stephen A. Terrile

(57) ABSTRACT

A method, system and computer-usable medium are disclosed for performing an automated anti-spoofing configuration operation, comprising: determining whether a source address of an internet protocol (IP) packet is allowed by a receiving interface of a firewall; determining whether the IP packet comprises a multicast packet when the IP packet is allowed by the receiving interface of the firewall; replacing the source address with a rendezvous point address; using the rendezvous point address to determine whether routing path information associated with the multicast packet matches information stored within a multicast routing information base for the receiving interface of the firewall; and, identifying the multicast packet as spoofed when the routing path information associated with multicast packet does not have corresponding information stored within the multicast routing information base.

17 Claims, 5 Drawing Sheets

(56) References Cited

U.S. PATENT DOCUMENTS

| | | | |
|---|---|---|---|
| 2014/0207850 A1* | 7/2014 | Bestler | H04L 67/1097 |
| | | | 709/203 |
| 2017/0126587 A1* | 5/2017 | Ranns | H04L 47/825 |
| 2019/0037029 A1* | 1/2019 | Border | H04L 67/141 |

OTHER PUBLICATIONS

Schmidt et al.; AuthoCast: a protocol for mobile multicast sender authentication; Published in: Proceeding; MoMM '08 Proceedings of the 6th International Conference on Advances in Mobile Computing and Multimedia; pp. 142-149; 2008; ACM Digital Library (Year: 2008).*
Check Point Software Technologies Ltd., Firewall and SmartDefense, Version NGX R62, 702048, Sep. 25, 2006.
Check Point Software Technologies Ltd., Softwareblades, Firewall R75.40, Administration Guide, Nov. 30, 2014.
Fortinet, FortiOS Handbook—Firewall, version 5.2.0, May 5, 2017.
Wikipedia, IP Address Spoofing, printed Aug. 16, 2017.
David Davis, Techrepublic, Prevent IP Spoofing with the Cisco IOS, Mar. 14, 2007.
evostream.com, Media Server and Video Streaming Software, https://evostream.com/#, printed Feb. 22, 2018.
wowza.com, Wowza Streaming Engine, https://www.wowza.com/products/streaming-engine, printed Feb. 22, 2018.
opencv.org, https://opencv.org/, printed Mar. 16, 2018.
stackoverflow.com, OpenCV Crop Live Feed from Camera, https://stackoverflow.com/questions/17352420/opencv-crop-live-feed-from-camera, printed Feb. 22, 2018.

* cited by examiner

AUTOMATIC ANTI-SPOOF FOR MULTICAST ROUTING

BACKGROUND OF THE INVENTION

Field of the Invention

The present invention relates in general to the field of computers and similar technologies, and in particular to software utilized in this field. Still more particularly, it relates to a method, system and computer-usable medium for automating changes to a firewall's multicast anti-spoofing configuration to improve network security.

Description of the Related Art

Multicasting is a commonly used networking approach for simultaneously providing information, such as streaming media, to a target group of information handling systems. While multicasting is an effective way to deliver large volumes of information to many recipients, it poses certain security risks. In particular, the source(s) of a data stream used in a distributed denial of service (DDoS) attack may be falsified, or spoofed, to hide the identity of a malicious sender or to make it appear it is originating from a trusted source.

In such attacks, a large number of spoofed network addresses are used to hide the actual source, or identity, of the sender. One known anti-spoofing approach to overcoming such security threats is ingress filtering, which includes blocking of incoming packets that originate from outside the network, but use a source address inside the network. Another approach is egress filtering, which includes blocking of outgoing packets that originate from inside the network, but use a source address that is outside the network. One known advantage of such approaches is reducing cybersecurity vulnerability by blocking packets illicitly implemented with spoofed addresses.

SUMMARY OF THE INVENTION

A method, system and computer-usable medium for performing an automated anti-spoofing configuration operation, comprising: determining whether a source address of an internet protocol (IP) packet is allowed by a receiving interface of a firewall; determining whether the IP packet comprises a multicast packet when the IP packet is allowed by the receiving interface of the firewall; replacing the source address with a rendezvous point address; using the rendezvous point address to determine whether routing path information associated with the multicast packet matches information stored within a multicast routing information base for the receiving interface of the firewall; and, identifying the multicast packet as spoofed when the routing path information associated with multicast packet does not have corresponding information stored within the multicast routing information base.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Certain aspects of the present disclosure include an appreciation that automated multicast anti-spoof solutions are not currently known. Instead, known multicast anti-spoofing solutions require some degree of manual configuration. Certain aspects of the present disclosure include an appreciation that such multicast anti-spoofing are configurations are not typically enabled by default.

A method, system and computer-usable medium are disclosed for automating changes to a firewall's multicast anti-spoofing configuration to improve network security. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a mobile device such as a tablet or smartphone, a connected "smart device," a network appliance, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more storage systems, one or more network ports for communicating externally, as well as various input and output (I/O) devices, such as a keyboard, a mouse, and a graphics display.

Figure 1:
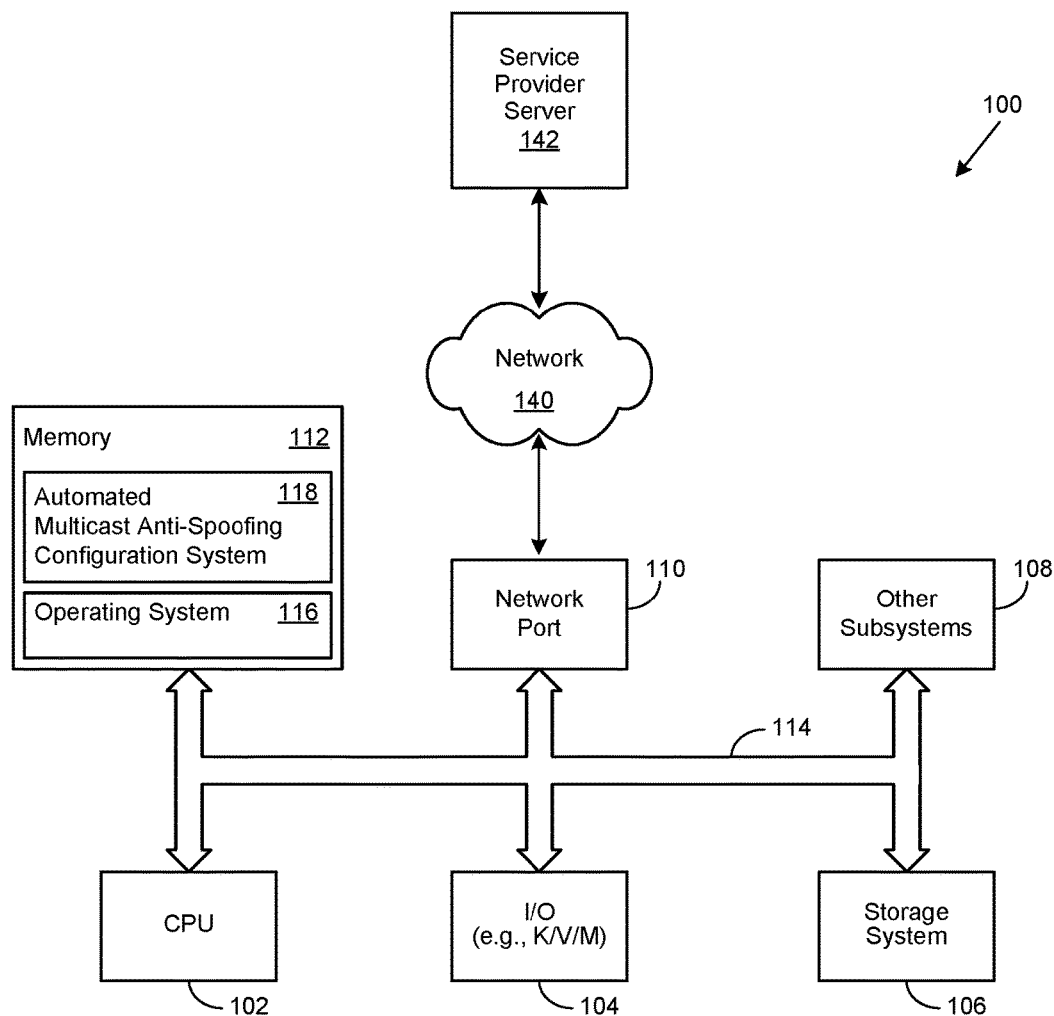
FIG. 1 depicts an exemplary client computer in which the present invention may be implemented.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a storage system 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further includes operating system (OS) 116 and in various embodiments may also include an automated multicast anti-spoofing configuration system 118. In one embodiment, the information handling system 100 is able to download the automated multicast anti-spoofing configuration system 118 from the service provider server 142. In another embodiment, the automated multicast anti-spoofing configuration system 118 is provided as a service from the service provider server 142.

In various embodiments, the automated anti-spoofing configuration system 118 performs an automated multicast anti-spoofing configuration operation. In certain embodiments, the automated anti-spoofing configuration operation improves processor efficiency, and thus the efficiency of the information handling system 100, by automating multicast anti-spoofing configuration operations. As will be appreciated, once the information handling system 100 is configured to perform the automated multicast anti-spoofing configuration operation, the information handling system 100 becomes a specialized computing device specifically configured to perform the automated multicast anti-spoofing configuration operation and is not a general purpose computing device. Moreover, the implementation of the automated multicast anti-spoofing configuration system 118 on the information handling system 100 improves the functionality of the information handling system 100 and provides a useful and concrete result of automating the multicast anti-spoofing configuration of a firewall.

Figure 2:
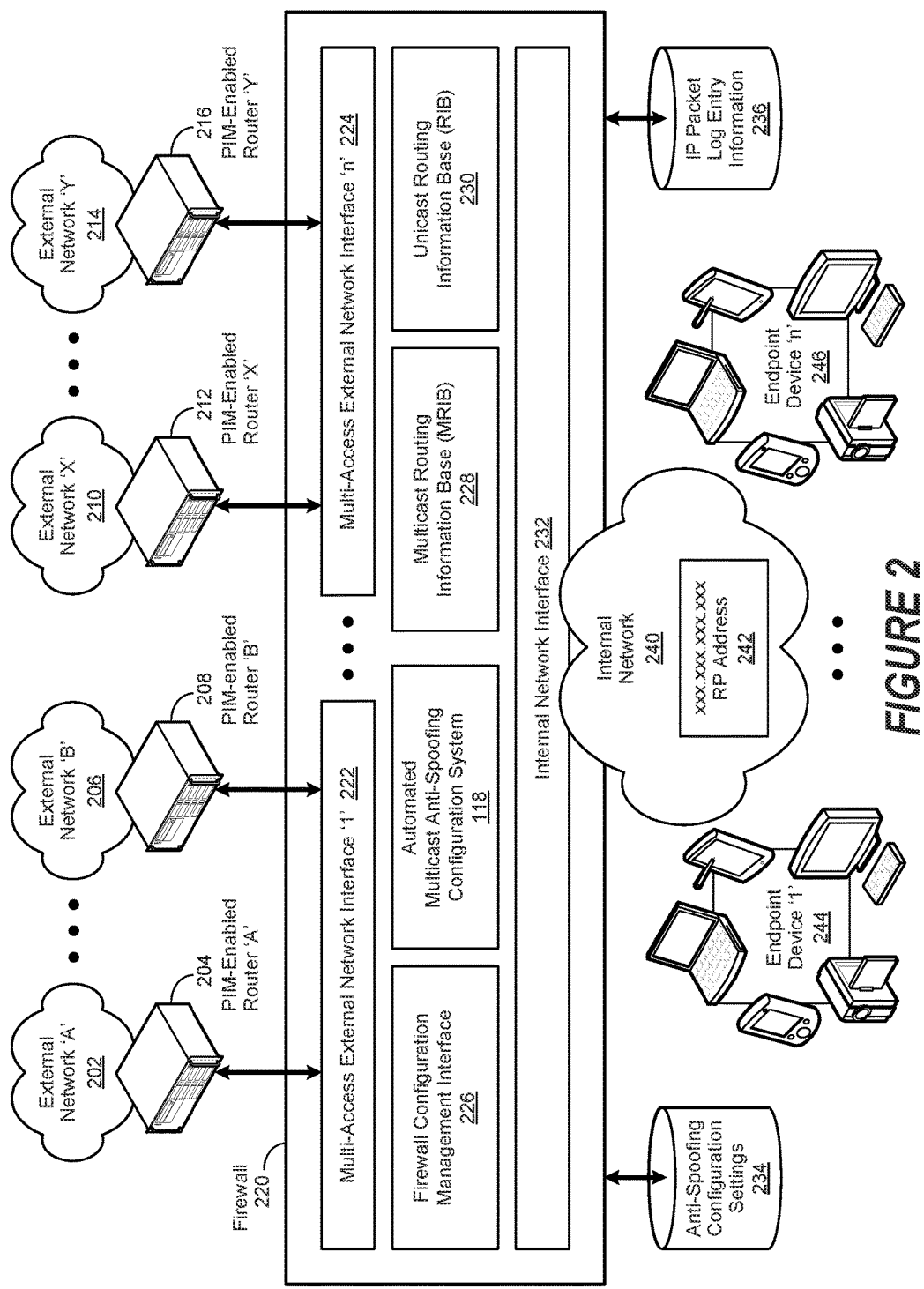
FIG. 2 is a simplified block diagram of an automated multicast anti-spoofing configuration system.

FIG. 2 is a simplified block diagram of an automated multicast anti-spoofing configuration system implemented in accordance with an embodiment of the invention to automate changes to a firewall's multicast anti-spoofing configuration. In certain embodiments, a firewall 220 may include multi-access network interfaces '1' 222. through 'n' 224, a firewall configuration management interface 226, and an automated anti-spoofing configuration system 118. In certain embodiments, one or more of the network interfaces may be an internal network interface or an external network interface. In certain embodiments, the firewall 220 may likewise include a multicast routing information base (MRIB), a unicast routing information base (RIB) 230, and an internal network interface 232.

The firewall 220 may likewise include in certain embodiments a repository of multicast anti-spoofing configuration settings 234 and a repository of multicast log entry information 236. In certain embodiments, the firewall configuration management interface 226 is implemented to receive automated multicast anti-spoofing configuration instructions from the automated anti-spoofing configuration system 118. In certain embodiments, the firewall 220 may be implemented as an individual firewall 220, a virtual context firewall 220, or a firewall 220 cluster.

Skilled practitioners of the art will be familiar with multicast, which is commonly used in a network environment for simultaneously providing Internet Protocol (IP) datagrams, or packets, to a target group of recipient network addresses in real-time or near real-time. In certain embodiments, the target group recipient network addresses may be respectively associated with a corresponding endpoint device '1' 244 through 'n' 246. As used herein, an endpoint device refers to an information processing system such as a personal computer, a laptop computer, a tablet computer, a personal digital assistant (PDA), a smart phone, a mobile telephone, a digital camera, a video camera, or other device capable of storing, processing and communicating data via a network, such as an internal network 240. In various embodiments, the communication of the data may take place in real-time or near-real-time.

Certain embodiments of the invention may reflect an appreciation that multiple source (SRC) network addresses may be used to improve the delivery speed of an associated multicast data stream to a group of recipient network addresses. However, those of skill in the art will likewise appreciate that multicast is often used in an attempt to compromise the security of a network. In particular, the SRC address(es) of IP packets in a multicast data stream used in a distributed denial of service (DDoS) attack may be falsified, or spoofed, to hide the identity of a malicious sender. More particularly, such falsification or spoofing may be used to make it appear the multicast data stream is originating from one or more trusted sources. It will likewise be appreciated that using multiple spoofed source addresses makes it more difficult to determine which multicast IP packets actually originate from trusted sources and which do not.

Known anti-spoofing approaches include ingress filtering, which is often used as a countermeasure against various spoofing attacks by attempting to ensure that incoming packets actually originate from the SRC address they claim. Certain embodiments of the invention may reflect an appreciation that various approaches for ingress filtering of unicast IP packets on a router are known. However, such ingress filtering is typically not enabled by default on a router. Likewise, certain embodiments reflect an appreciation that such ingress filtering on a router may be implemented by manually configuring access lists, automatically comparing a packet's SRC address to its reverse path in a unicast routing table, or a combination thereof. In these embodiments, the packet may be spoofed if the SRC address of the packet does not match its reverse path. However, skilled practitioners of the art will likewise be aware that such spoofing is sometimes used for legitimate purposes (e.g., network testing), which may reduce the effectiveness of ingress filtering for identifying maliciously spoofed IP packets.

Certain embodiments of the invention may further reflect an appreciation that such approaches may include automating adjustments to ingress packet filtering processes according to dynamic routing information, even when network traffic asymmetrical. Likewise, certain aspects of the invention may reflect an appreciation that such approaches are often limited to router interfaces receiving unicast IP packets from edge networks. Certain embodiments of the invention may likewise reflect an appreciation that when ingress packet filtering is used by a router, it is typically implemented as a silent drop, where dropped packets are not logged.

Certain embodiments of the invention may reflect an appreciation that ingress packet filtering implemented on a firewall 220 is commonly referred to as anti-spoofing. More particularly, certain embodiments of the invention may reflect an appreciation that such anti-spoofing is typically implemented on a firewall 220 to block incoming packets that originate from outside the internal network 240, but use a SRC address from inside the internal network 240. Likewise, certain embodiments of the invention may reflect an appreciation that such anti-spoofing is frequently implemented on a firewall 220 by default. Furthermore, certain embodiments of the invention may likewise reflect an appreciation that implementing such anti-spoofing on all interfaces of a firewall 220, such as multi-access external network interfaces '1' 222 through 'n' 224, is often recommended. Likewise, certain embodiments of the invention may further reflect an appreciation that packets dropped by such anti-spoofing on a firewall 220 are typically logged and stored. In certain embodiments, information related to the spoofed packets is stored in a repository of IP packet log entry information 236.

Certain embodiments of the invention may reflect an appreciation that multicast routing, and especially the use of Protocol Independent Multicast (PIM) for multicast routing, may result in legitimate packets from certain trusted source IP addresses being received from a different direction than unicast IP packets from the same source IP address. Those of skill in the art will be familiar with PIM, which broadly refers to a family of multicast routing protocols used in IP-based networks to provide one-to-many and many-to-many distribution of data to a target group of recipient network addresses. In particular, PIM is characterized as "protocol-independent" as the family of PIM protocols does not include the ability to discover the topology of a network. Instead, it relies upon routing information used by other routing protocols, such as those used for routing unicast packets.

Certain embodiments of the invention may reflect an appreciation that PIM is not dependent upon a particular unicast routing protocol. Instead it is capable of using any currently known unicast routing protocol implemented within an IP-based network environment, such as the internal network 240 shown in FIG. 2. Certain embodiments of the invention may likewise reflect an appreciation that PIM does not build its own routing tables. Instead, it is able to use existing unicast routing tables for an IP packet's reverse path forwarding information. Likewise, certain embodiments of the invention may reflect an appreciation that such reverse path forwarding information can be used advantageously by a firewall 220 in the performance of multicast anti-spoofing operations.

Likewise, certain embodiments of the invention may reflect an appreciation that even in simple network topologies, and even when a rendezvous point (RP) is placed close to the sender, a typical firewall 220 placement may still only receive multicast IP packets through interfaces that also receive unicast IP packets from the same SRC address. Certain embodiments of the invention may likewise reflect an appreciation that a network, such as an internal network 240, may need to be highly available. Accordingly, alternative paths, and associated anti-spoofing, may be incorrectly defined if unicast routing is not working correctly. Certain embodiments of the invention may further reflect an appreciation that manual tuning of anti-spoofing, or disabling of anti-spoofing, may be required in such cases.

Certain embodiments of the invention may reflect an appreciation that multicast dynamic routing uses the PIM protocol to create a multicast routing topology, which typically results in a need to reconfigure existing anti-spoof rules. Accordingly, certain embodiments of the invention may reflect a further appreciation that such reconfiguration can be error-prone, which in turn may result in causing security issues. Likewise, certain embodiments of the invention may reflect an appreciation that when using access lists or ingress packet filtering as an anti-spoofing approach, it is possible to use a different filter for multicast traffic. Furthermore, certain embodiments of the invention may reflect an appreciation that PIM multicast routing and other known anti-spoofing approaches have been used together for some time. However, an automated anti-spoofing approach that is optimized for the nature of multicast traffic in general, and more specifically, the PIM-Sparse Mode (PIM-SM) traffic forwarding model, is not currently known.

Those of skill in the art will be familiar with PIM-SM, which broadly refers to a version of PIM that is commonly used to establish a core-base tree to forward multicast datagrams in a network. One aspect of PIM-SM is its use to determine the core, or rendezvous point (RP) address 242, of a group of recipient network addresses, such as their respective class-D, or multicast, IP address corresponding to a target candidate RP address 242. In such an approach, the hash function is characterized by its ability to evenly and uniquely choose the core for a group of recipient network addresses. Furthermore, it is insensitive to the geographic distribution of the group members and its associated multicast sources.

Certain embodiments of the invention may reflect an appreciation that approaches based upon simply disabling ingress packet filtering from multicast traffic relies upon trusting that multicast forwarding will ignore packets that fail to match the current multicast forwarding table. Furthermore, certain embodiments of the invention may reflect an appreciation that such an approach in a router-oriented environment may be sufficient as long as the router itself is not acting as a multicast listener. However, in a firewall-oriented environment, where allowed traffic is more strictly defined and logs are collected from allowed and denied traffic, such an approach is insufficient, even if the firewall 220 is not acting as a multicast listener. Likewise, certain embodiments of the invention may reflect an appreciation that the ability to log multicast IP packets that are actually spoofed, without false positives, would be advantageous in a firewall-oriented environment.

In certain embodiments, the automated multicast anti-spoofing configuration system 118 shown in FIG. 2 is implemented to automate changes to a firewall's 220 multicast anti-spoofing configuration to improve network security. In certain embodiments, operations for automating the multicast anti-spoofing configuration of a firewall 220 are begun by first receiving an Internet Protocol (IP) packet and then determining its SRC address. In turn, the SRC address is then compared to a list of SRC addresses the external firewall 220 interface that received the multicast IP packet is allowed to accept.

In certain embodiments, the particular SRC addresses the external network interfaces '1' 222 through 'n' 224 are allowed to accept are stored in a routing information base (RIB) 230. As used herein, an RIB 230 broadly refers to a database, or repository, of routing information associated with individual unicast IP packets. In certain embodiments, the unicast IP packets are received by the multi-access external network interfaces '1' 222 through 'n' 224. In certain embodiments, the multi-access external network interfaces '1' 222 through 'n' 224 are configured to receive unicast IP packets, multicast IP packets, or a combination thereof.

If it is determined that the SRC address of the IP packet received by external network interfaces '1' 222 through 'n' 224 is not allowed for acceptance, information related to its receipt, examination and discarding are logged and the IP packet is then discarded. In certain embodiments, certain information related to the IP packet's receipt, examination and discarding may not be logged. In these embodiments, the method of determining which information is, or is not, logged is a matter of design choice. In certain embodiments, logged information related to the IP packet is stored in a repository of IP packet log entry information 236.

However, if it was determined that the SRC address of the IP packet is allowed for acceptance by the external firewall interface that received it, then a determination is made whether the IP packet is a multicast IP packet. If the IP packet is not allowed for acceptance, then unicast anti-spoofing operations familiar to skilled practitioners of the art are performed. Otherwise, a determination is made whether the external network interface on the firewall 220 that received the multicast IP packet is PIM-enabled.

In certain embodiments, individual multi-access external network interfaces '1' 222 through 'n' 224 may be PIM-enabled. In certain embodiments, multicast IP packets received by the multi-access external network interfaces '1' 222 through 'n' 224 may originate from individual PIM-enabled routers 'A' 204 through 'B' 208, 'X' 212 through 'Y' 216, or a combination thereof. In certain embodiments, the PIM-enabled routers 'A' 204 through 'B' 208 and 'X' 212 through 'Y' 216 may be respectively associated with external networks 'A' 202 through 'B' 206 and 'X' 212 through 'Y' 214. In certain embodiments, the SRC addresses of various multicast IP packets may be respectively associated with a corresponding router, such as PIM-enabled routers 'A' 204 through 'B' 208 and 'X' 212 through 'Y' 216. Likewise, individual multicast IP packets may be variously received by an individual multi-access external network interface '1' 222 through 'n' 224, or a combination thereof.

If it was determined that the multicast IP packet was not received on a enabled external network interface on the firewall 220, then routing and other information associated with the SRC address of the multicast IP packet is compared to corresponding routing and other information stored in a multicast routing information base (MRIB) 228. As used herein, an MRIB 228 broadly refers to a collection of routing and other information associated with individual multicast packets. If it is determined that the routing and other information associated with the SRC address of the multicast IP packet matches routing and other information stored in the MRIB 228, then the multicast IP packet is considered to be not spoofed.

However, if it does not, or if it was determined the multicast IP packet was not received by a PIM-enabled external network interface on the firewall 220, the multicast IP packet is processed to determine the current Rendezvous Point (RP) address 242 of its associated multicast group. As used herein, a RP broadly refers to a router in a multicast network domain that acts as a shared root for a multicast shared tree. As likewise used herein, an RP address 242 broadly refers to a network address associated with an RP. Skilled practitioners of the art will be aware that any number of routers can be configured to work as RPs and in certain embodiments they may be configured to cover different multicast group ranges.

However, if it is determined that the multicast IP packet was received by a PIM-enabled external network interface, the firewall's 220 settings are then automatically configured to use the previously-determined RP address of the multicast IP packet in place of its SRC address to perform multicast anti-spoofing look-up operations. In certain embodiments, the automated multicast anti-spoofing configuration system 118 is implemented to automatically configure the firewall's 220 multicast anti-spoofing settings. In certain embodiments, the automated multicast anti-spoofing configuration system 118 may be implemented to provide changes to the firewall's 220 multicast anti-spoofing configuration settings to the firewall configuration management interface 226. In these embodiments, the method by which the firewall's 220 multicast anti-spoofing settings are changed is a matter of design choice. In certain embodiments, the firewall's 220 multicast anti-spoofing settings are stored in a repository of anti-spoofing configuration settings 234. In these embodiments, the method by which the firewall's 220 multicast anti-spoofing settings are stored is a matter of design choice. Those of skill in the art will recognize that many such embodiments are possible. Accordingly, the foregoing is not intended to limit the spirit, scope or intent of the invention.

A determination is then made whether the RP address 242 of the multicast IP packet matches the RP address 242 of its associated active multicast joins. As used herein, a multicast join broadly refers to one or more recipient network addresses respectively associated with an RP address 242 designated as the destination of a group of multicast IP packets associated with a particular multicast session. As an example, the recipient network addresses may respectively be associated with endpoint devices '1' 244 through 'n' 246, which are in turn associated with a particular RP address 242. In this example, the association of each network address respectively associated with endpoint devices '1' 244 through 'n' 246 with the RP address 242 results in a multicast join. As likewise used herein, an active multicast join broadly refers to a multicast join that is in active state, wherein a multicast source is sending multicast IP packets, and one or more recipient network addresses are receiving them, at a particular RP address 242.

If it is determined that the RP address 242 of the multicast IP packet matches the RP address 242 of its associated active multicast joins, then a determination is made whether logging of information related to the multicast IP packet is required. As an example, certain governmental regulations, or an organization's internal policies, may require logging of information related to spoofed multicast IP packets. If it is determined that logging of information related to the multicast IP packet is required, then it is logged accordingly. In certain embodiments, logged information related to the multicast IP packet is stored in a repository of IP packet log entry information 236. In certain embodiments, the multicast IP packet is then passed to PIM for processing.

However, if it is determined that the RP address 242 of the multicast IP packet does not match the RP address 242 of its associated active multicast joins, then a determination is made whether the RP address 242 of the multicast IP packet matches the RP address 242 of other active multicast joins. If so, then a determination is then made whether logging of information related to the multicast IP packet is required. If it is determined that logging of information related to the multicast IP packet is required, then it is logged as described in greater detail herein.

However, if the RP address 242 of the multicast IP packet does not match the RP address 242 of other active joins, then it is considered to be spoofed. A determination is then made whether logging of information related to the spoofed multicast IP packet is required. If not, then the spoofed multicast IP packet is discarded without logging its related information. Otherwise, information related to the multicast IP packet is logged, as described in greater detail herein, and the multicast IP packet is discarded. In certain embodiments, the number of such log entries may be limited to a particular number. In these embodiments, the number of such log entries is a matter of design choice.

Figure 3A:
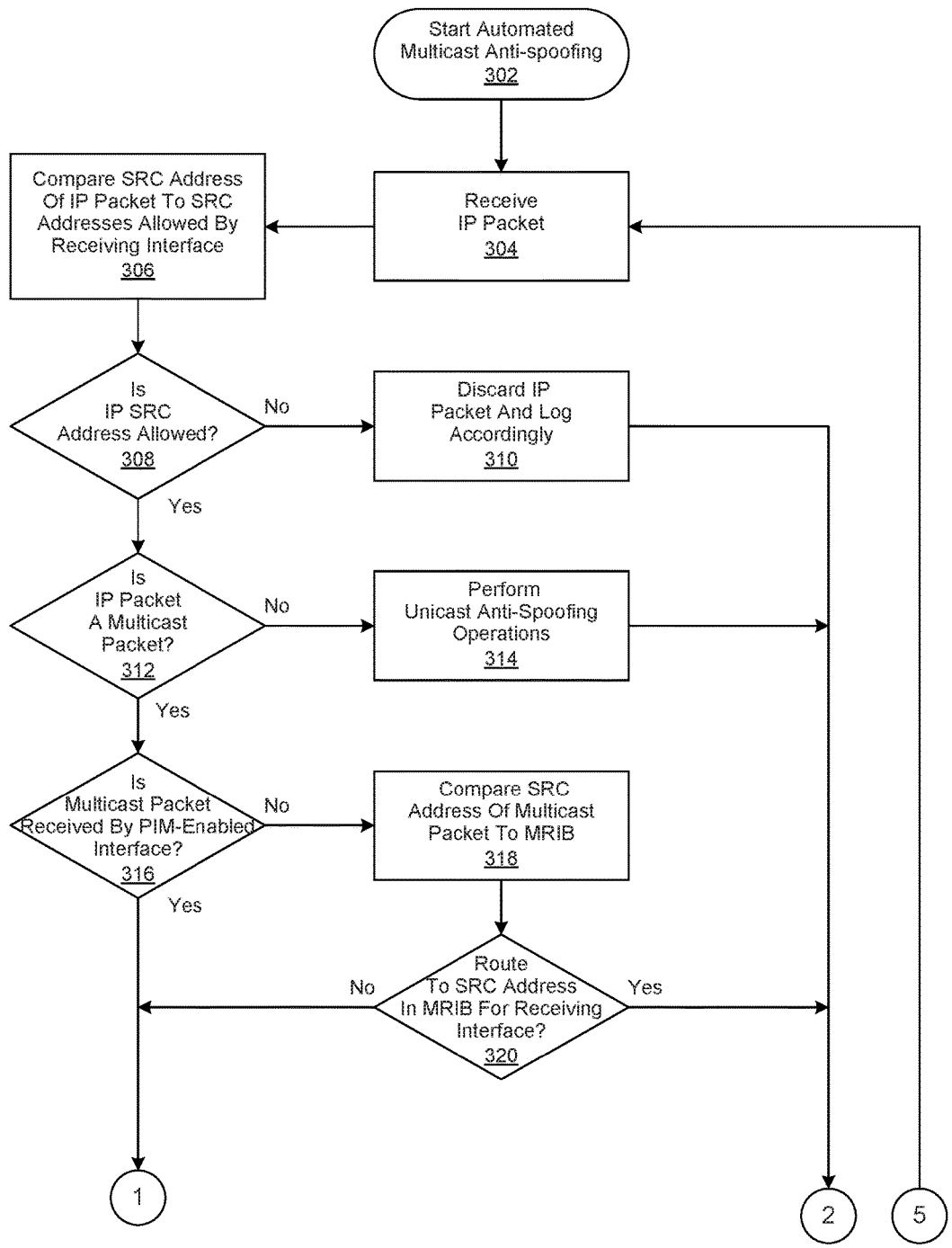
FIGS. 3a through 3c are a generalized flowchart of the performance of automated multicast anti-spoofing configuration system operations.
Figure 3B:
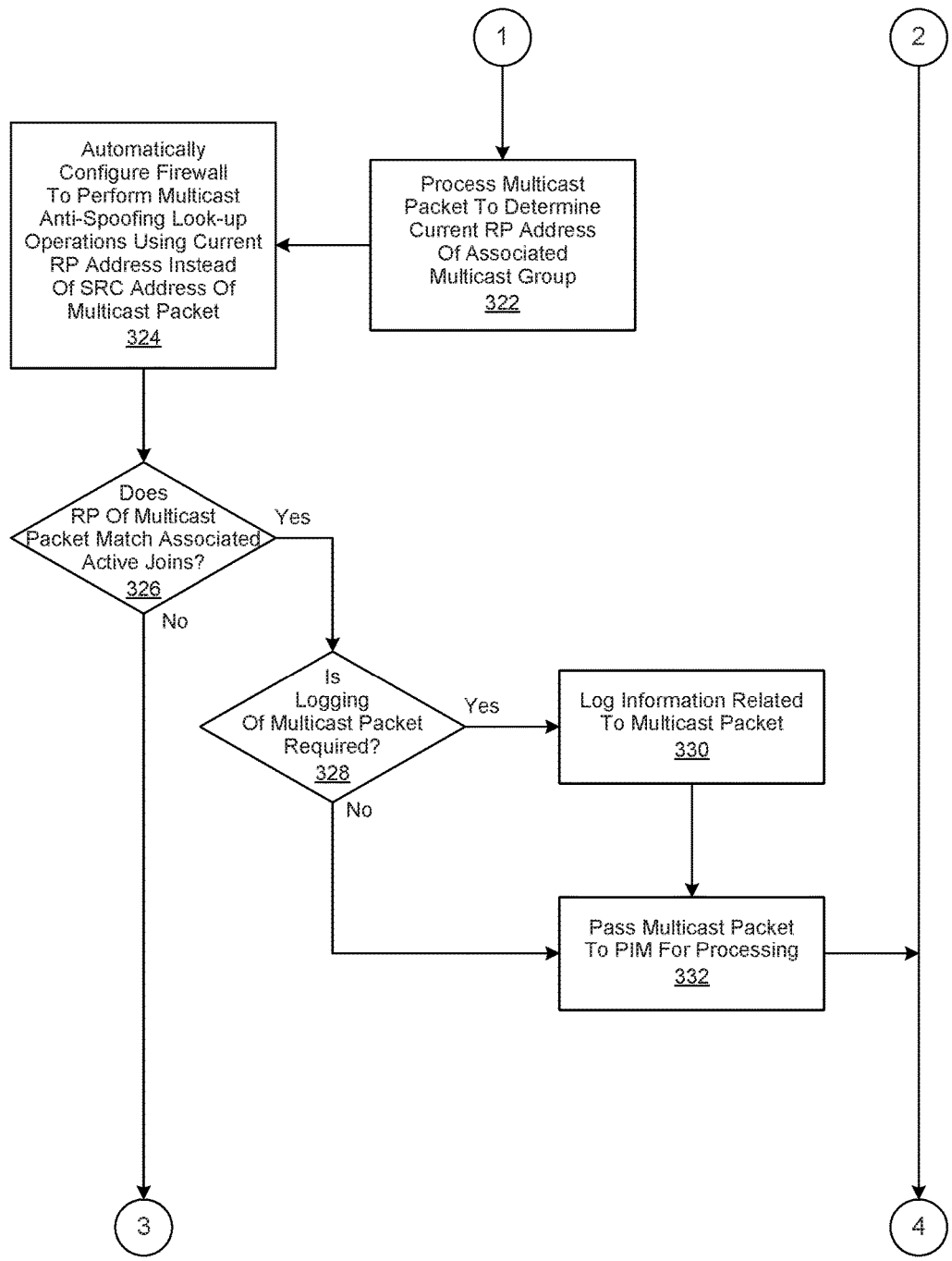
Figure 3C:
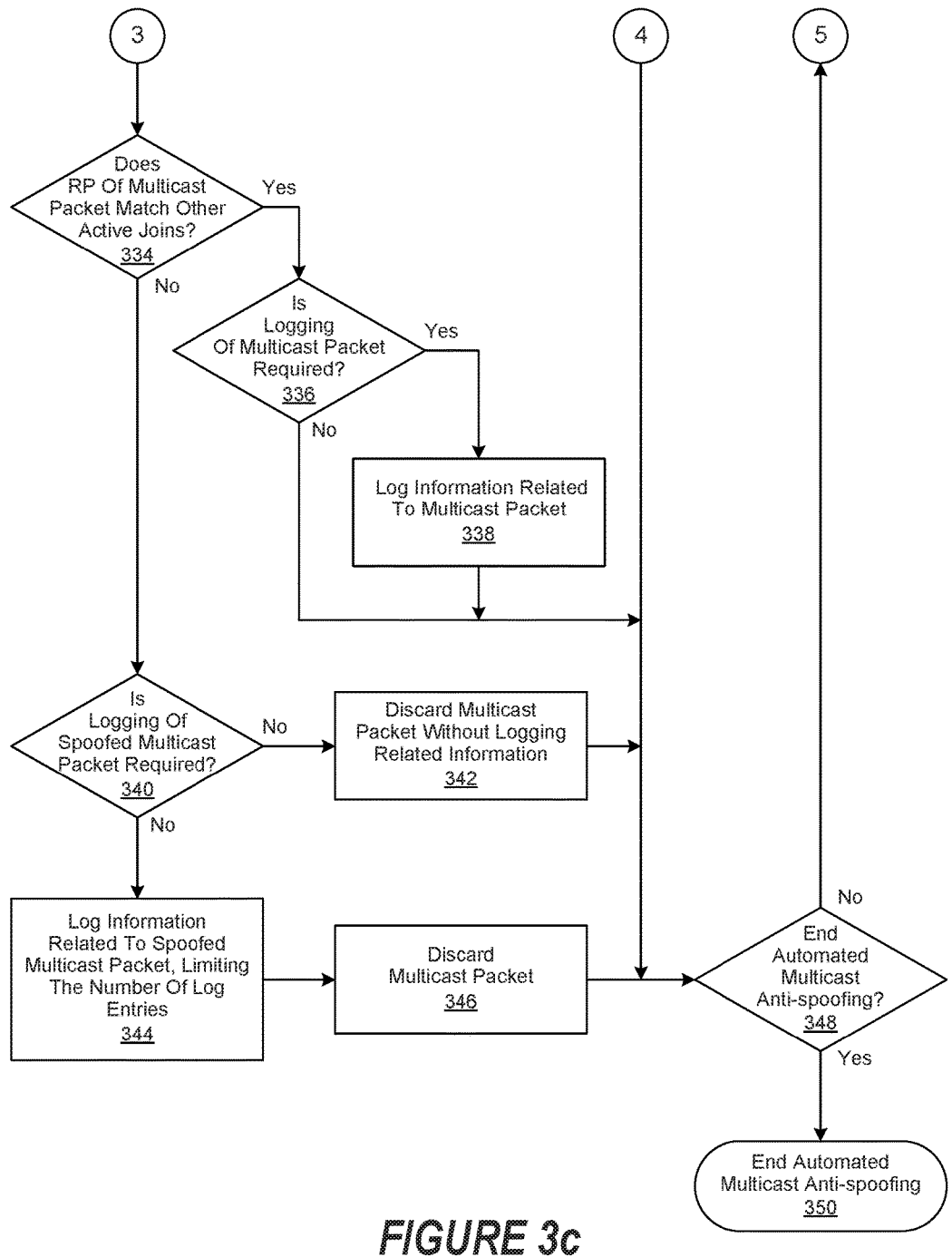

FIGS. 3a through 3c are a generalized flowchart of the performance of automated multicast anti-spoofing configuration system operations implemented in accordance with an embodiment of the invention. In this embodiment, operations for automating the multicast anti-spoofing configuration of a firewall are begun in step 302, followed by the receipt of an Internet Protocol (IP) packet in step 304. The source (SRC) address of the IP packet is then compared to a list of SRC addresses the external firewall interface that received the multicast IP packet is allowed to accept.

A determination is then made in step 308 whether the SRC address of the IP packet is allowed for acceptance by the external firewall interface that received it. If not, then the IP packet is discarded and information related to its receipt, examination and discarding are accordingly logged, or not, in step 310. A determination is then made in step 348 whether to end operations for automating the multicast anti-spoofing configuration of a firewall. If so, then operations for automating the multicast anti-spoofing configuration of a firewall are ended in step 350. Otherwise, the process is continued, proceeding with step 304.

However, if it was determined in step 308 that the SRC address of the IP packet was allowed for acceptance by the external firewall interface that received it, then a determination is made in step 312 whether the IP packet received in step 304 is a multicast IP packet. If not, then unicast anti-spoofing operations familiar to skilled practitioners of the art are performed in step 314 and the process is continued, proceeding with step 348. Otherwise, a determination is made in step 316 whether the external network interface on the firewall that received the multicast IP packet is Protocol-Independent Multicast (PIM) enabled. If not, then the routing of the SRC address of the multicast IP packet is compared to routing and other information stored in a multicast routing information base (MRIB) in step 318.

A determination is then made in step 320 whether the routing of the SRC address and other information related to the multicast IP packet matches routing and other information stored in the MRIB for the external interface on the firewall that received it. If so, the process is continued, proceeding with step 348. Otherwise, or if it was determined in step 316 that the multicast IP packet was received by a PIM-enabled external interface on the firewall, then the multicast IP packet is processed in step 322 to determine the current Rendezvous Point (RP) address of its associated multicast group. The firewall is then automatically configured in step 324, as described in greater detail herein, to use the RP address determined in step 322 in place of the SRC address of the multicast IP packet to perform multicast anti-spoofing look-up operations. A determination is then made in step 326 whether the RP address of the multicast IP packet matches the RP address of its associated active joins, as described in greater detail herein.

If so, then a determination is made in step 328 whether logging of information related to the multicast IP packet is required, as likewise described in greater detail herein. If so, then information related to the spoofed multicast IP packet is logged in step 330. Once the information related to the multicast IP packet has been logged in step 330 as being spoofed, or if it was determined in step 328 to not log information related to the multicast IP packet, the multicast IP packet is passed to PIM for processing. The process is then continued, proceeding with step 348.

However, if it was determined in step 326 that the RP address of the multicast IP packet does not match its associated active joins, then a determination is made in step 334 whether the RP address of the spoofed multicast IP packet matches the RP address of other active joins. If so, then a determination is made in step 336 whether logging of information related to the multicast IP packet is required. If so, then information related to the multicast IP packet is logged in step 338. Otherwise, or if it was determined in step 336 that logging of information related to the multicast IP packet is not required, then the process is continued, proceeding with step 348.

Once the spoofed multicast IP packet has been discarded in either step 336 or step 338, the process is continued, proceeding with step 340. However, if it was determined in step 334 that the RP address of the spoofed multicast IP packet does not match the RP address of other active joins, then it is considered to be spoofed. Accordingly, a determination is made in step 340 whether information related to the spoofed multicast IP packet is required. If not, the multicast IP packet is discarded without logging its related information and the process is continued, proceeding with step 348.

Otherwise, information related to the spoofed multicast IP packet is logged in step 344. In certain embodiments, the number of such log entries may be limited to a particular number within a certain period of time (e.g., five log entries per minute). In these embodiments, the number of such log entries within a particular interval of time is a matter of design choice. The spoofed multicast IP packet is then discarded in step 346 and the process is continued, proceeding with step 348.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing an automated anti-spoofing configuration operation, comprising:
    determining whether a source address of an internet protocol (IP) packet is allowed by a receiving interface of a firewall;
    determining whether the IP packet comprises a multicast packet when the IP packet is allowed by the receiving interface of the firewall;
    replacing the source address with a rendezvous point address;
    using the rendezvous point address to determine whether routing path information associated with the multicast packet matches information stored within a multicast routing information base for the receiving interface of the firewall; and,
    identifying the multicast packet as spoofed when the routing path information associated with the multicast packet does not have corresponding information stored within the multicast routing information base;
    comparing the rendezvous point address of the multicast packet with a rendezvous point address for any active multicast joins to determine whether the rendezvous point address of the multicast packet has an associated active multi cast join; and,
    identifying the multicast packet as spoofed when the rendezvous point address does not have an associated active multicast join.

2. The method of claim 1, wherein:
the receiving interface of the firewall comprises a network interface.

3. The method of claim 1, wherein:
the active multicast join comprises a recipient network address associated with a rendezvous address designated as a destination of a group of multicast packets associated with a particular multicast session.

4. The method of claim 1, further comprising:
    determining whether logging of the multicast packet is required; and,
    logging information relating to the multicast packet when logging of the multicast packet is required.

5. The method of claim 1, further comprising:
    determining whether the multicast packet is received by a Protocol independent Multicast (PIM) enabled interface of a firewall when the IP packet comprises the multicast packet.

6. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
    determining whether a source address of an internet protocol (IP) packet is allowed by a receiving interface of a firewall;
    determining whether the IP packet comprises a multicast packet when the IP packet is allowed by the receiving interface of the firewall;
    replacing the source address with a rendezvous point address;
    using the rendezvous point address to determine whether routing path information associated with the multicast packet matches information stored within a multicast routing information base for the receiving interface of the firewall; and,
    identifying the multicast packet as spoofed when the routing path information associated with the multicast packet does not have corresponding information stored within the multicast routing information base;
    comparing the rendezvous point address of the multicast packet with a rendezvous point address for any active multicast joins to determine whether the rendezvous point address of the multicast packet has an associated active multicast join; and,
    identifying the multicast packet as spoofed when the rendezvous point address does not have an associated active multicast join.

7. The system of claim 6, wherein:
the receiving interface of the firewall comprises a network interface.

8. The system of claim 6, wherein:
the active multicast join comprises a recipient network address associated with a rendezvous address designated as a destination of a group of multicast packets associated with a particular multicast session.

9. The system of claim 6, wherein the instructions executable by the processor are further configured for:
    determining whether logging of the multicast packet is required; and,
    logging information relating to the multicast packet when logging of the multicast packet is required.

10. The system of claim 6, wherein the instructions executable by the processor are further configured for:
    determining whether the multicast packet is received by a Protocol independent Multicast (PIM) enabled interface of a firewall when the IP packet comprises the multicast packet.

11. A non-transitory, computer-readable storage medium embodying computer program code, the computer program code comprising computer executable instructions configured for:

determining whether a source address of an internet protocol (IP) packet is allowed by a receiving interface of a firewall;

determining whether the IP packet comprises a multicast packet when the IP packet is allowed by the receiving interface of the firewall;

replacing the source address with a rendezvous point address;

using the rendezvous point address to determine whether routing path information associated with the multicast packet matches information stored within a multicast routing information base for the receiving interface of the firewall; and, identifying the multicast packet as spoofed when the routing path information associated with the multicast packet does not have corresponding information stored within the multicast routing information base;

comparing the rendezvous point address of the multicast packet with a rendezvous point address for any active multicast joins to determine whether the rendezvous point address of the multicast packet has an associated active multicast join; and, identifying the multicast packet as spoofed when the rendezvous point address does not have an associated active multicast join.

12. The non-transitory, computer-readable storage medium of claim 11, wherein:

the receiving interface of the firewall comprises a network interface.

13. The non-transitory, computer-readable storage medium of claim 11, wherein:

the active multicast join comprises a recipient network address associated with a rendezvous address designated as a destination of a group of multicast packets associated with a particular multicast session.

14. The non-transitory, computer-readable storage medium of claim 11, wherein the computer executable instructions are further configured for:

determining whether logging of the multicast packet is required; and, logging information relating to the multicast packet when logging of the multicast packet is required.

15. The non-transitory, computer-readable storage medium of claim 11, wherein the computer executable instructions are further configured for:

determining whether the multicast packet is received by a Protocol Independent Multicast (PIM) enabled interface of a firewall when the IP packet comprises the multicast packet.

16. The non-transitory, computer-readable storage medium of claim 11, wherein:

the computer executable instructions are deployable to a client system from a server system at a remote location.

17. The non-transitory, computer-readable storage medium of claim 11, wherein:

the computer executable instructions are provided by a service provider to a user on an on-demand basis.

\* \* \* \* \*